United States Patent [19]

Bostjancic

[11] Patent Number: 5,474,653
[45] Date of Patent: Dec. 12, 1995

[54] METHOD FOR CONTROLLING SOLID PARTICLE FLOW IN AN EVAPORATOR

[75] Inventor: Joseph J. Bostjancic, Renton, Wash.

[73] Assignee: Ionics, Incorporated, Watertown, Mass.

[21] Appl. No.: 261,283

[22] Filed: Jun. 16, 1994

Related U.S. Application Data

[60] Continuation of Ser. No. 889,442, May 26, 1992, abandoned, which is a division of Ser. No. 596,246, Oct. 12, 1990, Pat. No. 5,116,473, which is a continuation of Ser. No. 198,325, May 25, 1988, Pat. No. 5,000,821.

[51] Int. Cl.$^6$ ............................................. B01D 1/00
[52] U.S. Cl. ..................... 159/47.1; 159/42; 159/44; 159/901; 209/11; 209/12.1; 210/767; 210/790; 210/194
[58] Field of Search ................... 159/42, 44, 901, 159/27.1, DIG. 40, 47.1; 209/11, 12.1; 210/194, 767, 790, 768

[56] References Cited

U.S. PATENT DOCUMENTS

| | | | |
|---|---|---|---|
| 351,795 | 11/1886 | Rice | 159/28.1 |
| 470,060 | 3/1892 | Lillie | 159/43.1 |
| 521,974 | 6/1894 | Cooper | 159/2.1 |
| 548,986 | 10/1895 | Hewitt | 119/43.1 |
| 774,201 | 11/1904 | Robischon | 4/289 |
| 898,147 | 9/1908 | Von Seemen | 105/429 |
| 1,028,737 | 6/1912 | Kestner | 159/49 |
| 1,191,108 | 7/1916 | Kestner | 159/27.2 |
| 2,182,428 | 12/1939 | Fladmark | 159/42 |
| 2,199,320 | 4/1940 | Von Le Juge | 159/27.2 |
| 2,512,938 | 6/1950 | Henszey | 159/31 |
| 2,583,364 | 1/1952 | Eckstrom | 159/13.1 |
| 2,764,233 | 9/1956 | Skinner | 159/13.2 |
| 2,800,307 | 7/1957 | Putney | 165/108 |
| 2,993,884 | 7/1961 | Ruegg et al. | 534/706 |
| 2,998,060 | 8/1961 | Eckstrom | 159/28.2 |
| 3,056,831 | 10/1962 | Stratford | 260/505.5 |
| 3,177,129 | 4/1965 | Huckins, Jr. | 159/27.2 |
| 3,192,130 | 6/1965 | Pottharst, Jr. | 159/901 |
| 3,292,999 | 12/1966 | Chirico | 422/252 |
| 3,425,083 | 2/1969 | Wennerberg | 15/104.06 |
| 3,729,042 | 4/1973 | Burnett | 202/181 |
| 3,819,053 | 6/1974 | Milotich | 210/196 |
| 3,849,232 | 11/1974 | Kessler et al. | 159/43.1 |
| 3,880,702 | 4/1975 | Troshenkin et al. | 159/43.1 |
| 3,933,576 | 1/1976 | Rushton | 159/901 |
| 3,976,430 | 8/1976 | Houston et al. | 422/245 |
| 4,082,606 | 4/1978 | Houston et al. | 159/27.3 |
| 4,248,296 | 2/1981 | Jezek | 165/118 |
| 4,278,495 | 7/1981 | Regehr | 159/27.2 |
| 4,288,285 | 9/1981 | Houston | 159/901 |
| 4,683,025 | 7/1987 | Flores | 159/43.1 |
| 4,734,269 | 3/1988 | Clarke et al. | 210/196 |
| 4,764,254 | 8/1988 | Rosenblad | 162/249 |
| 4,828,717 | 5/1989 | DeLeeuw et al. | 210/196 |

FOREIGN PATENT DOCUMENTS

| | | |
|---|---|---|
| 1692967 | 8/1971 | Germany. |
| 60-80081 | 5/1985 | Japan. |
| 466221 | 1/1969 | Switzerland. |

*Primary Examiner*—Virginia Manoharan
*Attorney, Agent, or Firm*—R. Reams Goodloe, Jr.

[57] ABSTRACT

A method for use in an evaporator for selectively controlling the flow of solid particles within the evaporator. The method provides for the separation of solids from a liquid through the use of a separation chamber having a plurality of apertures, each of which has a critical size. In the separation chamber, solid particles which are larger than a critical size are separated from the remainder of the solution. The separated particles exit the separation chamber via a bypass conduit for circulation directly to the sump of the evaporator for recombining with the separated liquid portion which passed through the separation chamber and was subsequently concentrated in the heat exchange tubes. The method prevents solid particles from clogging the system and allows for continuous circulation of the solution and solid particles.

4 Claims, 2 Drawing Sheets

METHOD FOR CONTROLLING SOLID PARTICLE FLOW IN AN EVAPORATOR

CROSS-RELATED TO RELATED APPLICATIONS

This is a continuation of Ser. No. 07/889,442, filed on May, 26, 1992, now abandoned, which is a divisional of U.S. patent application Ser. No. 07/596,246, filed Oct. 12, 1990, which issued as U.S. Pat. No. 5,116,473; which is a continuation of U.S. Ser. No. 07/198,325, filed May 25, 1988, which issued as U.S. Pat. No. 5,000,821.

TECHNICAL FIELD

The present invention relates in general to an apparatus for selectively controlling the flow of solid particles in evaporators having vertical heat exchange tubes, including falling film evaporators.

BACKGROUND ART

A wide range of industries employ evaporators for concentrating solutions and slurries, including oil refining, synthetic fuel production, food processing, herbicide and pesticide production, electric generating stations, primary metal refining, pharmaceutical production, and pulp and paper manufacture. The evaporators may be used to increase the concentration of a fluid component, and/or to crystallize a solute component. Various types of evaporators are available and are well known in the prior art. An example is a vertical, tube-in-shell, falling film evaporator. In such evaporators, a solution or slurry is circulated repeatedly through heat exchange tubes. As the solution or slurry passes through the heat exchange tubes, the solvent, i.e., water or organic solvent, is gradually evaporated, leaving a more concentrated solution or slurry, and often causing solute components to precipitate.

Evaporators typically include various chambers, apertures, and tubes through which the solution or slurry must pass repeatedly as it is concentrated. Care must be taken to provide for efficient flow of solid particles as well as liquid. Slurries contain solid particles even during initial stages of concentration, while solutions contain solutes, i.e., salts, which may precipitate out of solution during concentration. These solid particles can cause clogging in various parts of the evaporator.

Deposits may occur along the walls or other surfaces of the evaporator. Deposits may break off in the form of chips or flakes, which can cause clogging of the evaporator and interrupt the flow of the solution or slurry to be concentrated. If the system is clogged and circulation cannot proceed efficiently, the system must be shut down to allow operators to clear and clean the blockage.

Deposits occur while the evaporator is in operation and also while the evaporator is shut down for cleaning; as the walls of the evaporator system are allowed to dry out during the cleaning operation, significant amounts of deposits can form. When the system is restarted and circulation is restored, the new deposits often flake off and reclog the system.

The clogging problem is most serious when chips lodge themselves within smaller apertures, such as the inlet orifices of the fluid distributors mounted at the top of heat exchange tubes. One such distributor is described in U.S. Pat. No. 4,248,296. Chips interfere with normal flow of the brine, and can effectively remove entire heat exchange tubes from operation.

Various attempts have been made to remove the chips or flakes by filtration. For example, screens or strainers have been fitted inside the evaporator system. However, such screens must be cleaned periodically, and in order to do so, the evaporator system must be shut down, resulting in lost time, increased costs of operation, and further formation of deposits. In addition, when the evaporator is restarted, additional chips and flakes may form downstream of the screen or strainer, and reclog the system.

It is, therefore, desirable to -design an apparatus which will facilitate separation of solid particles from liquid, and which will not require the system to be shut down for cleaning of the separation apparatus.

DISCLOSURE OF THE INVENTION

It is an object of the present invention to separate solid particles from liquid in a solution or slurry undergoing concentration in an evaporator system.

It is a further object of the present invention to provide for continuous separation of solid particles from liquid within an evaporator without the need for periodic shutting down of the system to clean the separation apparatus.

It is another object of the present invention to provide a bypass route through which solid particles can circulate through the system, rather than being deposited at the site of the separation apparatus.

It is still a further object of the present invention to provide an apparatus which enhances the turbulent flow of solid particles within the liquid so as to facilitate breaking up of solid particles into smaller units.

These and other objects will become apparent to those skilled in the art from the description of the invention which follows.

The present invention discloses a solid particle flow apparatus for use in an evaporator for concentrating slurries or solutions containing solid particles and liquid. Such evaporators may be falling film evaporators, and the like. They include a plurality of substantially vertical heat exchange tubes, a lower reservoir positioned below the heat exchange tubes, a second reservoir positioned above the heat exchange tubes, and recirculation conduit for recirculating slurry or solution from the lower reservoir to the upper reservoir.

The solid particle flow apparatus of the present invention includes a separation chamber which has an inlet and an outlet. The inlet is positionable to receive slurry or solution from the recirculation conduit. The outlet is connected to the bypass conduit, described below. The outlet may be positioned at substantially the lowest portion of the separation chamber to encourage travel of the separated solid particles toward the outlet under the influence of gravity.

The separation chamber also has a plurality of apertures which are sized to separate solid particles from liquid. The size of each aperture is a "critical" size—a predetermined size above which the solid particles cause unacceptable clogging of various parts of the evaporator. Solid particles larger than the critical size are preferably separated from the liquid to prevent clogging downstream. The chamber apertures communicate a substantial portion of the liquid to the upper reservoir exterior of the separation chamber for passage through the heat exchange tubes to the lower reservoir.

In addition, the solid particle flow apparatus has a bypass conduit which is connected to the outlet of the separation chamber and which is positionable to channel solid particles which are larger than the critical size from the separation chamber to the lower reservoir. The solid particles which are channeled through the bypass conduit do not enter the upper reservoir exterior of the separation chamber. A substantial portion of the liquid exits the separation chamber through the apertures to the upper reservoir exterior of the separation chamber. The liquid is then recombined with the separated solid particles in the lower reservoir after first passing through the heat exchange tubes.

The bypass conduit of the present invention may be positionable to channel the separated solid particles to one or more of the plurality of heat exchange tubes for travel to the lower reservoir while preventing the separated solid particles from entering the remainder of the plurality of heat exchange tubes.

The separation chamber of the present invention, or a portion thereof, may be substantially conical in shape. The separation chamber may be constructed from steel screen material, or from steel material in which apertures have been punched or formed.

The separation chamber may be sized to fit between an upper wall of the evaporator and the top of the heat exchange tubes. Further, the separation chamber may be attached for support to an upper wall of the evaporator. The chamber inlet may be positioned in an upper portion of the separation. Similarly, the chamber outlet may be positioned in a lower portion of of the chamber. For example, the chamber may be conical in shape and may have an outlet in a lower portion of the conically-shaped chamber. The chamber may also have tapered sidewalls and may have an outlet positioned at a lower point of the tapered sidewalls.

The present invention also includes a method for selectively and continuously separating solid particles having a size larger than a critical size from liquid in a slurry or solution being concentrated in an evaporator. The critical size is a predetermined size above which the solid particles cause unacceptable clogging in various apertures in the evaporator. The method includes the steps of providing at least a first reservoir for the slurry or solution; separating from the liquid solid particles having a size larger than a critical size; channeling to the first reservoir the solid particles which were removed from the liquid; channeling to the first reservoir the solid particles which were removed from the liquid; and channeling the concentrated liquid to the first reservoir.

The separation step of the method of the present invention may also include the steps of providing a separation chamber having apertures with a size substantially equal to the critical size or smaller; providing a second reservoir in fluid communication with the heat exchanger; positioning the separation chamber within the second reservoir; and recirculating the slurry or solution from the first reservoir into the separation chamber. The step of channeling the solid particles to the first reservoir may further include the step of providing a bypass conduit connected to and leading from the separation chamber to the first reservoir without passage of the separated solid particles through the heat exchanger.

PREFERRED EMBODIMENT

Figure 1:
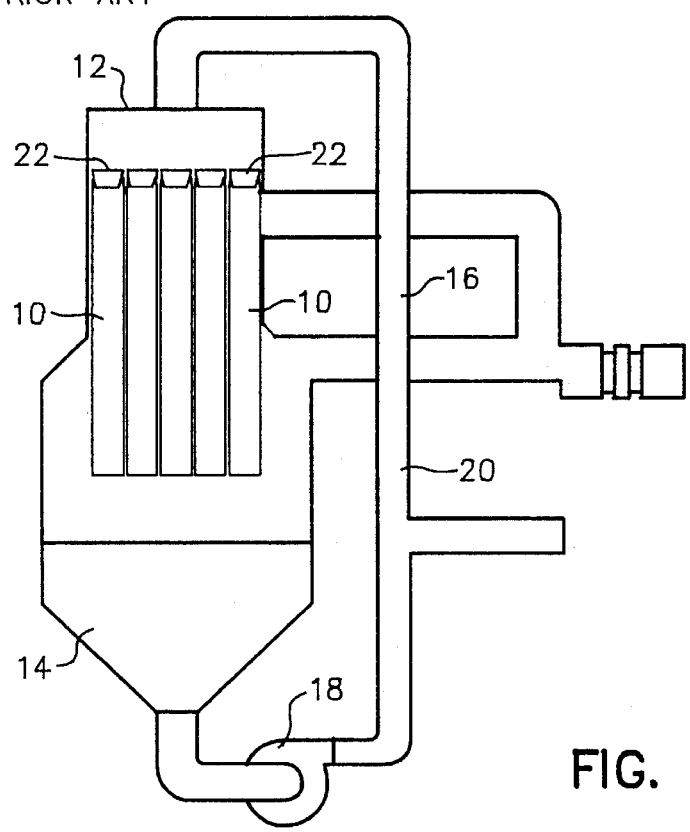
FIG. 1 is a schematic of a prior art evaporator without the apparatus of the present invention.

The solid particle flow apparatus of the present invention is designed for use with an evaporator for concentrating slurries and/or solutions. A typical prior art falling film evaporator is shown in FIG. 1. Such evaporators usually include a plurality of heat exchange tubes 10 arranged substantially vertically. The evaporator also has an upper reservoir or flood box 12, a lower reservoir or sump 14, and a recirculation means 16 for recirculating the slurry or solution from the lower reservoir to the upper reservoir. The recirculation means typically includes at least one recirculation conduit 20, and a recirculation pump 18. Also typically present in evaporators, but not shown for clarity, are heating means, means for introducing slurry or solution to the evaporator, and means for removing concentrated slurry or solution from the evaporator.

In operation, an evaporator such as the one depicted in FIG. 1 continuously circulates the slurry or solution from the lower reservoir 14, through the recirculating means 16, back to the upper reservoir 12. The slurry or solution repeatedly passes through the heat exchange tubes 10, where solvent is evaporated, leaving a more concentrated slurry or solution.

The heat exchange tubes 10 may be fitted with distributors 22 which direct the slurry or solution as it enters the heat exchange tubes. An example of distributors is described in U.S. Pat. No. 4,248,296, issued to Louis J. Jezek and entitled "Fluid Distributor for Condensor Tubes". Distributors, such as those described in the Jezek patent, introduce the slurry or solution into the heat exchange tubes in a film form, thus enhancing evaporation. Such distributors have small apertures which must remain open in order for the evaporator to run most efficiently. Solid particles, such as chips or flakes in the slurry or solution can block and clog the apertures in the distributor, preventing normal thin film flow and limiting performance of the heat exchange tubes, or if completely blocked, effectively remove the tube from service.

Figure 2:
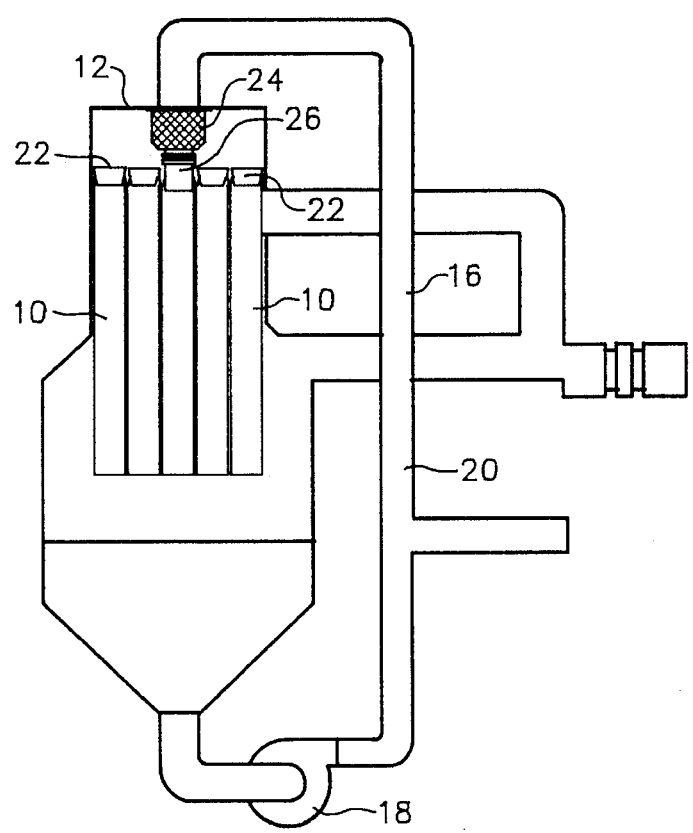
FIG. 2 shows an evaporator fitted with the apparatus of the present invention.

The solid particle flow apparatus of the present invention is designed to prevent such blockage, in distributors or elsewhere in the system, by selectively controlling the flow of solid particles. FIG. 2 shows the evaporator of FIG. 1 fitted with an apparatus of the present invention. The solid particle flow apparatus includes a separation chamber 24 and a bypass conduit 26.

Figure 3:
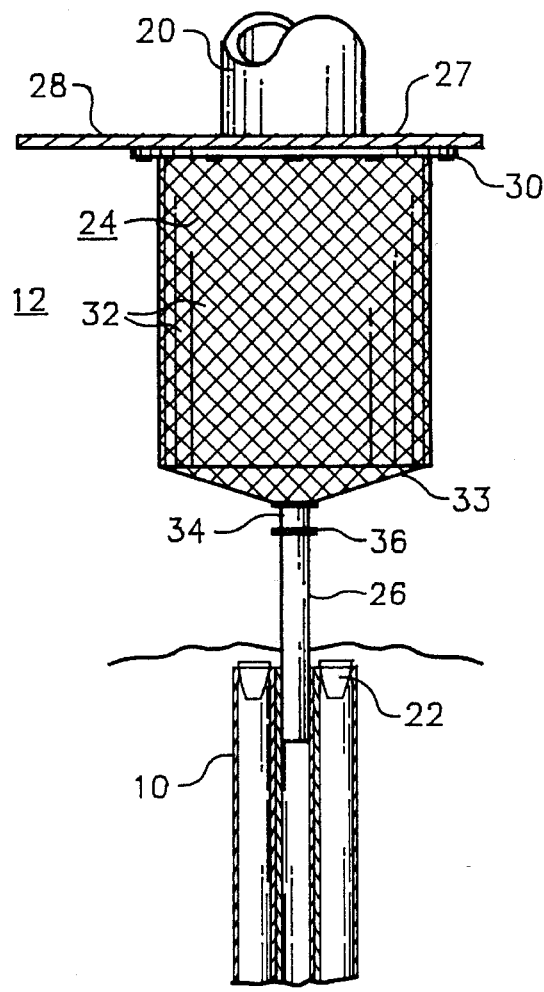
FIG. 3 shows a detailed view of the apparatus of the present invention.

FIG. 3 is a more detailed illustration of the solid particle flow apparatus. The separation chamber 24 is fitted within the upper reservoir 12 and is positioned below an outlet 27 of the recirculation conduit 20. The separation chamber is preferably attached to a cover 28 of the upper reservoir by bolts, screws, pins or other means of attachment 30.

The separation chamber 24 includes a plurality of apertures 32 which are sized to separate solid particles from liquid. Each chamber aperture 32 is of a "critical size." The critical size may vary from system to system but should be equal to or smaller than the apertures downstream of the separation chamber and upstream of the heat exchange tubes. As such, the chamber apertures 32 should be of such dimensions as to separate from the liquid all solid particles which are large enough to block apertures downstream of the separation chamber and upstream of the heat exchange tubes, for example, the apertures in the distributors 22.

The separation chamber 24 may be constructed from sheet steel into which holes, preferably round ones, have been punched or otherwise formed. It also may be constructed from steel screen or mesh material. Preferably, the separation chamber is conical in shape, or at least a lower portion 33 of the separation chamber is conical in shape, such as is shown in FIG. 3. This shape helps to funnel the solid particles down to an outlet 34 of the separation chamber 24 which is located at the bottom of the lower portion 33 of the separation chamber. The chamber outlet communicates with the bypass conduit 26. The bypass conduit is attached to the chamber outlet 34 by conventional attachment means 36. The bypass conduit extends from the separation chamber outlet into at least one of the heat exchange tubes 10. Preferably, the bypass conduit is sized to fit within the heat exchange tube. The heat exchange tube into which the bypass conduit is fitted has no distributor in it.

The apparatus of the present invention may be incorporated into evaporators during original construction, or, may be retrofitted to existing evaporators. For example, many evaporators have doors, or manholes, in the top of the upper reservoir 12 to allow operators to enter the upper reservoir to permit its cleaning and maintenance. The apparatus of the present invention may be constructed outside the evaporator and then installed by an operator entering the upper reservoir through the existing doors. Not only does the present invention improve the efficiency of the conventional evaporator, the present invention is economical to construct and install as original equipment or as a retrofit on existing evaporators.

In operation, the slurry or solution circulating in the evaporator undergoes concentration. It is circulated from the lower reservoir 14 to the upper reservoir 12 through the recirculation conduit 20. The separation chamber 24 receives the recirculated slurry or solution from the outlet 27 of the recirculation conduit. Upon entering the separation chamber, the slurry or solution undergoes physical separation, whereby solid particles which are larger than the critical size are separated from the liquid, and a substantial portion of the liquid component exits the separation chamber through the chamber apertures 32. The exiting liquid enters the upper reservoir exterior of the separation chamber and then enters the heat exchange tubes 10 where it is further concentrated. Solid particles which are larger than the critical size and will not pass through the chamber apertures 32 exit the separation chamber through the chamber outlet 34 into the bypass conduit 26. The solid particles then pass directly to one of the heat exchange tubes 10 into which the bypass conduit is fitted for travel to the lower reservoir 14.

In addition to its straining function, the separation chamber 24 also helps to reduce the size of the solid particles through turbulence and impact of the solid particles against the wall of the separation chamber. When the size of the solid particles is sufficiently reduced, the solid particles will no longer cause clogging problems in the evaporator.

Figure 4:
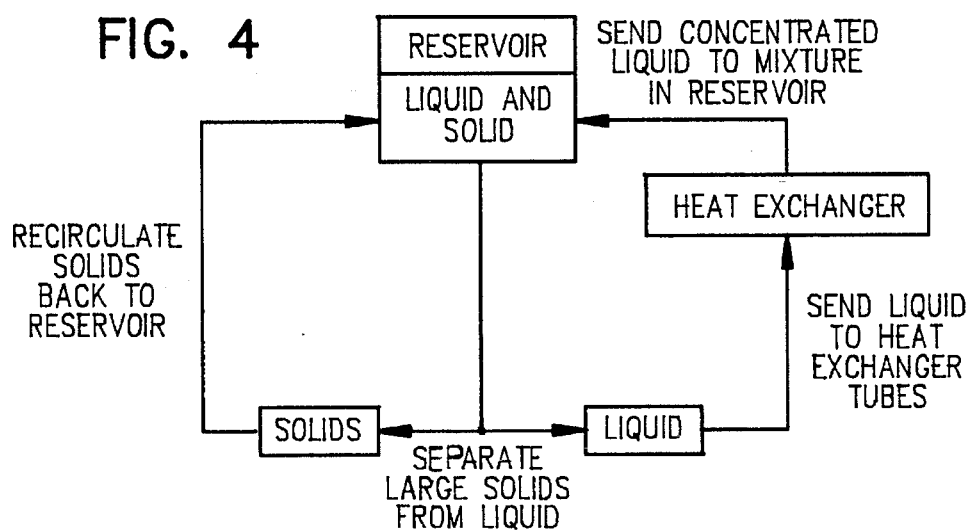
FIG. 4 is a flow chart schematically illustrating the steps of the method taught by the present invention.

The present invention also includes a method for selectively controlling the flow of solid particles within the evaporator. The following discussion of the method of the present invention is better understood with reference to the flow chart shown in FIG. 4.

A slurry or solution undergoing concentration in the evaporator is held in the reservoir. The slurry or solution has a liquid component and solid particles, the solid particles usually being of varying sizes. The first step of the method of the present invention is to separate from the liquid component the solid particles which are larger than the critical size. Particles which are larger than the critical size and which, therefore, will not flow through downstream apertures will be removed from the slurry or solution before the slurry or solution continues downstream, i.e., enters the distributors of the evaporator.

A second step in the method is to recirculate the separated solid particles back to the reservoir containing the slurry or solution. Preferably, this step of recirculation is achieved by washing the solid particles through a conduit with the aid of some of the liquid from the slurry or solution.

A third step in the method is to direct the separated liquid to the heat exchange tubes of the evaporator. The liquid may contain solid particles; however, they will all be of a size smaller than the critical size and hence will not create blockage problems in the distributors or heat exchange tubes. Within the heat exchange tubes, the liquid undergoes concentration.

A final step in the method is to direct the concentrated liquid back to the reservoir containing the slurry or solution where it is again mixed with the solids which were removed in the first step.

The method of the present invention provides for continual circulation of solid particles, and does not provide for a building up of solid particles at any point in the system, such as would a conventional filter. As the solid particles are constantly separated from the liquid and recirculated, at least a portion of them will decrease in size as a result of the turbulence, and will pose less of a clogging problem.

From the foregoing, it will be appreciated that, although embodiments of the invention have been described herein for purposes of illustration, various modifications may be made without deviating from the spirit and scope of the invention. Accordingly, the invention is not limited except as by the appended claims.

I claim:

1. A method for controlling a flow of solid particles having a size larger than a critical size in an evaporator, the evaporator for concentrating slurries or solutions containing solid particles and liquid, the critical size being a predetermined size above which the solid particles cause unacceptable clogging of the evaporator, said method comprising the following steps:

separating from the liquid the solid particles which have a size larger than the critical size by introducing the slurry or solution to the interior of a separation chamber having apertures which allow particles of the critical size or smaller to pass therethrough, and which apertures do not allow particles larger than the critical size to pass from the separation chamber;

retaining inside said separation chamber at least a portion of said particles initially larger than the critical size, until at least a portion of the particles initially larger than the critical size are reduced in size to at least the critical size or smaller by impact of oversize particles against a separation chamber wall, so that particles which are reduced to the critical size or smaller can pass through said apertures;

channeling from the separation chamber to a reservoir (i) a portion of the separated solid particles larger than the critical size, and (ii) a portion of the liquid;

channeling the remaining liquid from which the solid particles were removed to a heat exchanger within the evaporator for concentration of the remaining liquid; and channeling the concentrated liquid to said reservoir for recombining with the separated solid particles larger than the critical size and with the portion of the liquid which carried said solid particles larger than the critical size to said reservoir.

2. The method of claim 1 wherein the separation step includes:

positioning the separation chamber in pressurizable fluid communication with a liquid recirculation pump; and directing the recombined concentrated liquid and the separated solids present in said reservoir back to the interior of the separation chamber.

3. The method of claim 1 wherein the step of channeling the solid particles to said reservoir is accomplished by passing the solid particles which are larger than the critical size through a bypass conduit connected to and leading from said reservoir by passage of the separated solids through one or more of the tubes in the heat exchanger without passing said solids through a heat exchanger inlet liquor distribution device, so as to provide sufficient liquid flow in said bypass conduit to continuously carry solids larger than the critical size to said reservoir without pluggage of said bypass conduit.

4. The method of claim 1 wherein the step of channeling the solid particles to said reservoir is accomplished by passing the solid particles which are larger than the critical size through a bypass conduit connected to and leading from said separation chamber to said reservoir, and in which sufficient liquid flow is provided in said bypass conduit to continuously carry solids larger than the critical size to said reservoir without pluggage of said bypass conduit.

* * * * *